(12) United States Patent
Grayson et al.

(10) Patent No.: US 9,008,005 B2
(45) Date of Patent: Apr. 14, 2015

(54) SYSTEM AND METHOD FOR PROVIDING INTELLIGENT GATEWAY SELECTION IN A NETWORK ENVIRONMENT

(75) Inventors: Mark Grayson, Maidenhead (GB); Adam MacHale, Worcs (GB)

(73) Assignee: Cisco Technology, Inc., San Jose, CA (US)

( * ) Notice: Subject to any disclaimer, the term of this patent is extended or adjusted under 35 U.S.C. 154(b) by 1324 days.

(21) Appl. No.: 12/430,707

(22) Filed: Apr. 27, 2009

(65) Prior Publication Data

US 2010/0272031 A1    Oct. 28, 2010

(51) Int. Cl.
*H04W 4/00* (2009.01)
*H04L 12/28* (2006.01)
*H04W 48/18* (2009.01)
*H04W 8/18* (2009.01)

(52) U.S. Cl.
CPC .............. *H04W 48/18* (2013.01); *H04W 8/18* (2013.01)

(58) Field of Classification Search
CPC ...................................................... H04W 4/00
USPC ........................................................ 370/329
See application file for complete search history.

(56) References Cited

U.S. PATENT DOCUMENTS

| | | | |
|---|---|---|---|
| 6,304,567 B1 | 10/2001 | Rosenberg | |
| 6,937,597 B1 | 8/2005 | Rosenberg et al. | |
| 6,970,909 B2 | 11/2005 | Schulzrinne | |
| 7,170,863 B1 | 1/2007 | Denman et al. | |
| 7,170,887 B2 | 1/2007 | Rosenberg | |
| 7,212,493 B2 * | 5/2007 | Shibasaki | 370/231 |
| 2004/0003241 A1 | 1/2004 | Sengodan et al. | |
| 2004/0106393 A1 * | 6/2004 | Chowdhury et al. | 455/406 |
| 2004/0219905 A1 | 11/2004 | Blumenthal et al. | |
| 2005/0238002 A1 | 10/2005 | Rasanen | |
| 2005/0278532 A1 | 12/2005 | Fu et al. | |
| 2006/0251043 A1 | 11/2006 | Madour et al. | |
| 2006/0251229 A1 | 11/2006 | Gorti et al. | |
| 2009/0047947 A1 * | 2/2009 | Giaretta et al. | 455/432.1 |

OTHER PUBLICATIONS

Dr. Lee, HyeonWoo, "3GPP LTE & 3GPP2 LTE Standardization," Samsung Electronics, KRnet, Jun. 27-28, 2006; 26 pages.

(Continued)

*Primary Examiner* — Chirag Shah
*Assistant Examiner* — Majid Esmaeilian
(74) *Attorney, Agent, or Firm* — Patent Capital Group

(57) ABSTRACT

An apparatus is provided in one example embodiment and includes a gateway configured to be coupled to a profiling function that evaluates past end user behavior in order to make a point of attachment determination in a network for the end user. In cases where the end user had previously operated as a nomadic user, the profiling function triggers the gateway to define an Internet Protocol (IP) service for the end user and the point of attachment is the gateway. In more specific embodiments, if the end user is determined to be mobile, the gateway establishes a mobility tunnel to a hierarchical gateway, which acts as the point of attachment to the network for the end user. In still other embodiments, the profiling function includes querying a database that includes a profile for the end user. A profile for the end user can be identified in a RADIUS accounting request.

21 Claims, 3 Drawing Sheets

(56) References Cited

OTHER PUBLICATIONS

WiMAX Forum Proprietary, "WiMAX Forum Network Architecture," (Stage 2: WiMAX Simple IP Networks), NWG Approved; Release 1.5 Version 1.0.1; Sep. 8, 2008 (27 pages); © 2007-2008.

WiMAX Forum Proprietary, "WiMAX Forum Network Architecture," (Stage 3: Detailed Protocols and Procedures) WiMAX Simple IP Networks, NWG Approved; Release 1.5 Version 1.0.1; Sep. 8, 2008 (71 pages); © 2007-2008.

* cited by examiner

US 9,008,005 B2

SYSTEM AND METHOD FOR PROVIDING INTELLIGENT GATEWAY SELECTION IN A NETWORK ENVIRONMENT

TECHNICAL FIELD OF THE INVENTION

This invention relates in general to the field of communications and, more particularly, to providing intelligent gateway selection in a network environment.

BACKGROUND OF THE INVENTION

Networking architectures have grown increasingly complex in communications environments. In addition, the augmentation of clients or end users wishing to communicate in a network environment has caused many networking configurations and systems to respond by adding elements to accommodate the increase in networking traffic. As the subscriber base of end users increases, proper routing and efficient management of communication sessions and data flows become even more critical. As service providers move toward a converged architecture for both nomadic and mobile end users, there is a significant challenge in optimally supporting all groups.

BRIEF DESCRIPTION OF THE DRAWINGS

To provide a more complete understanding of example embodiments and features and advantages thereof, reference is made to the following description, taken in conjunction with the accompanying figures, wherein like reference numerals represent like parts, in which.

DETAILED DESCRIPTION OF EXAMPLE EMBODIMENTS

Overview

An apparatus is provided in one example embodiment and includes a decision function configured to be coupled to a profiling function that evaluates past end user behavior in order to make a point of attachment determination in a network for the end user. In cases where the end user had previously operated as a nomadic user, the profiling function triggers the decision function to define an Internet Protocol (IP) service for the end user and a distributed the point of attachment. In one embodiment, the decision function is collocated with a gateway function and the distributed point of attachment is the gateway. In more specific embodiments, if the end user is determined to be mobile, the decision function will trigger a gateway to establish a mobility tunnel to a hierarchical gateway, which acts as a centralized point of attachment to the network for the end user. In still other embodiments, the profiling function includes querying a database that includes a profile for the end user. A profile for the end user can be identified in a response to a RADIUS accounting start message. In still other embodiments, the profile for the end user is appended to a RADIUS Access Accept message that is sent when the end user is granted access to a network.

Figure 1:
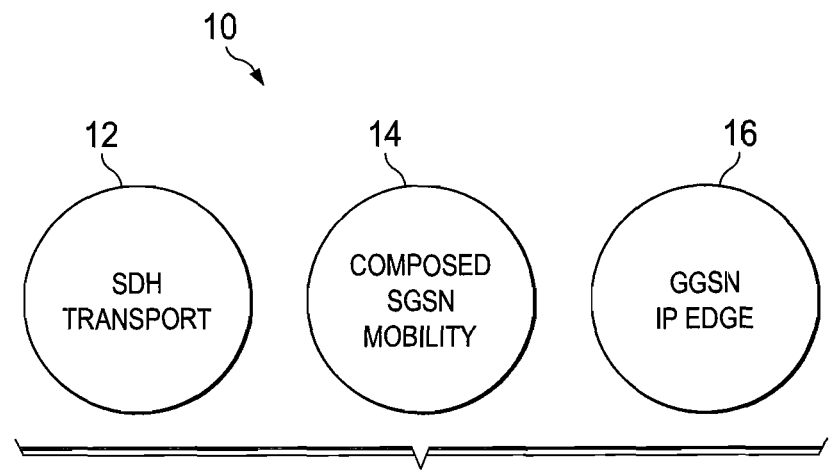
FIG. 1 is a simplified schematic diagram of a communication system for providing user support in a network environment in accordance with one embodiment.

Turning to FIG. 1, FIG. 1 is a simplified schematic diagram of a communication system 10 for providing user support in a network environment. Communication system 10 includes a synchronous digital hierarchy (SDH) transport element 12, a composed serving GPRS support node (SGSN) mobility element 14, and a gateway GPRS support node (GGSN) Internet Protocol (IP) edge element 16. SDH transport element 12 can be associated with a random access network (RAN) architecture. The composed SGSN element can relate to mobility features and a transient anchor. This element can further involve a user plane and a control plane for various types of signaling.

Each of the elements of FIG. 1 may couple to one another through simple interfaces (as illustrated) or through any other suitable connection (wired or wireless), which provides a viable pathway for network communications. Additionally, any one or more of these elements may be combined or removed from the architecture based on particular configuration needs.

Communication system 10 may include a configuration capable of transmission control protocol/internet protocol (TCP/IP) communications for the transmission or reception of packets in a network. Communication system 10 may also operate in conjunction with a user datagram protocol/IP (UDP/IP) or any other suitable protocol or tunneling technique, where appropriate and based on particular needs.

Routing end user data continues to be an important concern for network operators. Networks (some of which are hierarchical) have been built and assume a certain level of mobility. These assumptions create a default for how data is routed, or where end users are anchored. While mobile traffic is increasing, simple nomadic users have become less mobile. For purposes of discussion, and in example embodiments, the term 'nomadic' is meant to include Wi-Fi, Wi-Max, wireless personal area network (W-PAN), Bluetooth, 802.11, 802.16, general desktop or laptop usage, etc. and, in broad terms, scenarios where there is a larger bandwidth being consumed. The term 'mobility' in example embodiments includes mobility applications such as GSM, GPRS, wideband code division multiple access (W-CDMA), CDMA, high-speed downlink packet access (HSDPA), etc.

Note that mobile networks have conventionally assumed highly mobile users (where mobility is the default for all end users) and, therefore, defined a hierarchical aggregation: anchoring users back in the core of the network in order to offer mobility via a centralized point of attachment. This additional level of hierarchy is not required for simple nomadic users. This is evident by WiMAX adoption of simple Internet Protocol (IP) option at the access server network-gateway (ASN-GW). Next generation mobile networks (NGMN) networks should support power mobile broadband users through long term evolution (LTE) USB modems [or the like] and mobile handset users. The optimal point of attachment for a nomadic user is sub-optimal for a highly mobile handset user; conversely, the optimal point of attachment for the highly mobile user is sub optimal for the nomadic power user. Access point name (APN) elements can be used for subscription based selection of a point of attachment, but they are subscription/SIM based and do not allow operating modes to be switched by the user.

There are gateway functions (e.g., packet data network (PDN) gateway functions) that include packet intelligence to analyze, for example, mobile protocols. As end users continue to change how they use mobility, the challenge becomes in determining where to allocate the gateway intelligence. One key to where this intelligence is located could reside in the control plane. This could include elements such as a mobility management entity (MME), or an SGSN in the 3G scenario. These elements can include decision functions, which select the serving gateway and/or the PDN gateway for a given set of end users. Inherent in this decision is whether mobility will be centralized or distributed. A first example aspect of the proffered architecture addresses an enhanced PDN gateway selection process, while a second example aspect addresses an improved serving gateway selection approach. Both of these concepts are further detailed below with reference to particular flows and example schematics that are illustrative of their capabilities.

Figure 2:
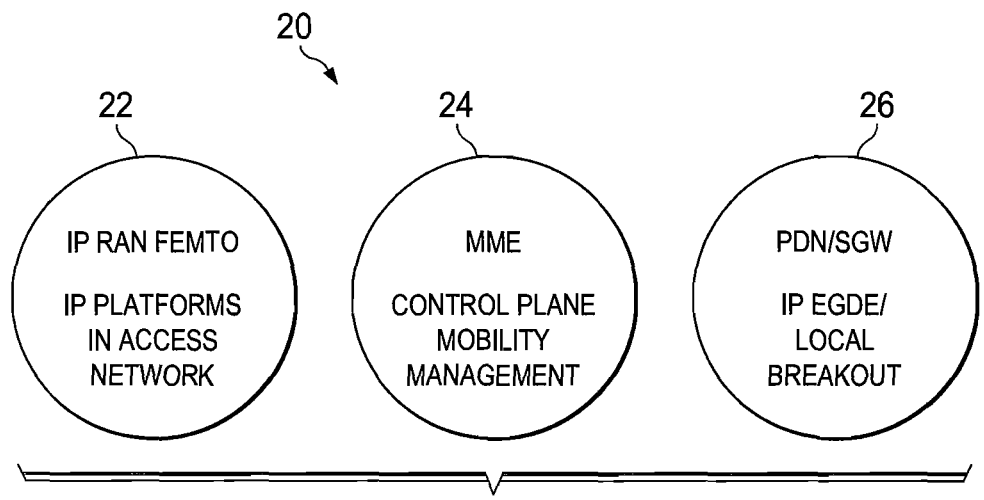
FIG. 2 is another simplified schematic diagram of a communication system for providing user support in a network environment in accordance with one embodiment.

FIG. 2 is a simplified schematic diagram of a forward-looking architecture, which offers some relational overlap with the elements of FIG. 1. FIG. 2 includes an IP RAN femto element 22, which includes IP platforms in an access network. FIG. 2 also includes an MME element 24, which offers mobility management and a control plane for end users to utilize. Also provided is a PDN/serving gateway (SGW) IP edge element 26. SGW IP edge element 26 can be augmented with optimal routing capabilities. Such a functionality allows defined packet flows to be diverted from normal switching into the mobility tunnel toward the PDN gateway, offering a local breakout capability for end users.

Figure 3:
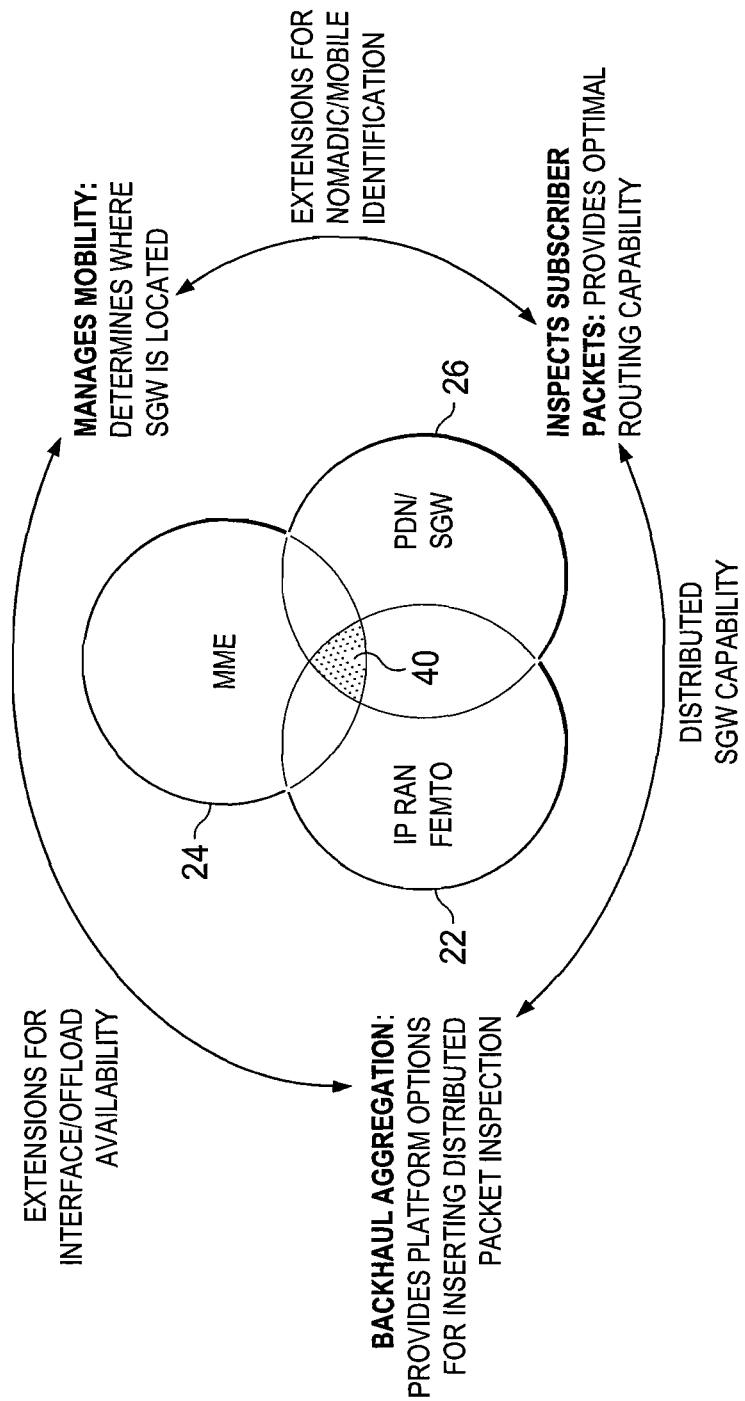
FIG. 3 is a simplified Venn diagram that illustrates an overlapping of the elements of FIG. 2.

FIG. 3 is a simplified Venn diagram that illustrates an overlapping of the previously discussed elements. The specific overlap between all three elements is illustrated at element 40. FIG. 3 is illustrative of a selective point of attachment, which can be offered to an end user, where the actual attachment can be based on information derived from a user profile. Such a functionality could allow for optimal support of nomadic and mobile users in an all-IP mobile network.

In example embodiments, an approach is defined that realizes the optimal point of attachment for nomadic broadband users and highly mobile broadband users. Other inferior techniques use the identity of the SIM card for making such a selection, but this does not support those users that switch SIM cards or modes of operation between highly mobile operations and nomadic broadband operations. In contrast to those flawed approaches, a profiling function is defined in example embodiments that is able to determine whether the user is highly mobile or nomadic [e.g., broadband]. This profiling function may be integrated into a gateway (e.g., a mobile gateway). The profiling function may entail monitoring the average bandwidth consumed by a user and the capability of later using this metric in gateway selection operations.

The particular profile of a user can be stored in a database. One example could involve the profile type being included in the RADIUS Accounting STOP request message sent by a mobile gateway at the end of a session. [Note that with this flow, as with the others detailed herein, RADIUS, TACACS, SS7 based MAP, and DIAMETER protocols can be implemented or substituted with other protocols that can achieve the intended communications.] A decision function could then consult such a database when a user attached to the network. The decision function may be integrated into a gateway, integrated into a control plane element (e.g., MME element 24), or integrated into a policy element (e.g., a policy server). Another option could involve the decision function configured to be coupled to (or residing in) a Policy and Charging Rules Function (PCRF) with a policy interface to an SGW. The decision function operation can be configured to be coupled with the network authentication procedure, whereby the user profile is appended to the RADIUS Access Accept message sent when the user is granted access to the network.

The profile in the RADIUS access accept message can be used to intelligently select the point of attachment for a particular user. In one embodiment, a profile indicating that the user had previously operated as a nomadic user could trigger the mobile gateway to define a simple IP service for the user, which could define the point of attachment as the mobile gateway itself. In another case, the user may be determined to be highly mobile and the gateway could then be operable to establish a macro mobility tunnel to a hierarchical gateway (e.g., a proxy mobile IP (PMIP) tunnel to a MIP Home Agent, which then acts as the user's point of attachment to the network).

Also provided in FIG. 3 is a set of arrows, which demonstrates the relationships between these elements when the decision function is collocated with the MME. MME element 24 includes a functionality for managing mobility. Moving clockwise from this function, illustrated are extensions for nomadic/mobile identification and these extensions can be provided as enhancements to these straddling elements (i.e., to MME element 24 and/or the PDN gateway and/or the SGW). For example, this would allow the serving gateway to indicate to the MME that the serving gateway suspects it is dealing with a nomadic end user. This could involve specific packet patterns that, in broad terms, indicate a probable nomadic end user.

Subscriber packet inspection is also provided at one end of this arrow and this could be provided in PDN/SGW IP edge element 26 (i.e., in the PDN gateway and/or the SGW). Continuing clockwise, there is a distributed SGW capability, which could be provided as extensions to the two elements to which it connects. This could involve the IP RAN femto element 22 signaling to the PDN/SGW that it has the ability to accept distributed gateway functionality. Further, at the end of this arrow is a backhaul aggregation function, which could be provided by IP RAN femto element 22. From this point, the arrow continues and depicts extensions for an interface/offload availability, which again can be provided as enhancements at the elements to which it connects. The extensions between the platform and the MME could allow the platform to signal that it has certain optimal routing capabilities and, further, it has a direct interface to the Internet or an Ethernet network, or to an xDSL connection (e.g., associated with a base station) to allow the offloading of a conventional RAN backhaul network. This could include offloading capabilities, which would allow for the identification of functionalities across the network. Thus, using these three generic concepts [illustrated as converging circles in FIG. 3], specific gateway capabilities can be located around the network, where a determination can be made as to how these capabilities can serve a particular user in a specific instance.

Both gateways [the PDN gateway and the serving gateway] are network elements that facilitate sessions and service flows between endpoints in a given network (e.g., for networks such as those illustrated in FIGS. 1-3). As used herein in this Specification, the term 'gateway' is meant to encompass routers, switches, bridges, loadbalancers, firewalls, servers, gateways, or any other suitable device, component, element, or object (e.g., a PCRF, a MME, a NAS, etc.) operable to exchange information in a network environment. Moreover, these network elements may include any suitable hardware, software, components, modules, interfaces, or objects that facilitate the operations thereof. This may be inclusive of appropriate algorithms and communication protocols that allow for the effective exchange of data or information.

In one example implementation, the PDN gateway and the serving gateway include software for achieving some or all of the functionalities outlined herein [for example, determining an intelligent point of attachment for a given end user based on some end user behavior (e.g., bandwidth, rate of cell changes, the rate of SGSN changes, geographic location, etc.)]. In other embodiments, this feature may be provided external to the gateways or included in some other network device to achieve these intended functionalities. Alternatively, both of these gateways and the MME component include this software (or reciprocating software) that can coordinate in order to achieve the gateway selection operations outlined herein. In still other embodiments, one, two, or all of these devices may include any suitable algorithms, hardware, software, components, modules, interfaces, or objects that facilitate the operations thereof.

Thus, the features outlined herein [for the PDN gateway selection and the serving gateway selection] can be realized via a number of possible options. For example, there could be intelligence provided in the MME, or the MME interface could be proxied and the intelligence could be provided in such a proxy. Other options include the PDN gateway and/or the serving gateway and/or a policy element (e.g., policy server). Note that, as used herein in this Specification, a system architecture evolution (SAE) gateway [which can be abbreviated 'SGW' in some instances] is a type of serving gateway, where other alternative gateways [potentially based on particular protocols] that address service issues for one or more end users could similarly be employed.

Each of these serving and PDN gateways (and the MME element) can also include memory elements for storing information to be used in achieving the control and general processing mechanisms outlined herein. Additionally, each of these devices may include a processor that can execute software (e.g., logic) or an algorithm to perform the activities discussed in this Specification. These components may further keep information in any suitable memory element such as a random access memory (RAM), read only memory (ROM), erasable programmable ROM (EPROM), electronically erasable PROM (EEPROM), application specific integrated circuit (ASIC), software, hardware, or in any other suitable component, device, element, or object where appropriate and based on particular needs.

The approaches outlined above can provide several advantages such as offering a more efficient use of overall network resources, which includes reduced overall usage of the IP mobility infrastructure by only invoking a specific gateway for devices that truly need and/or can use IP mobility. The architecture also offers less overall bandwidth usage by not routing packets to certain gateways and, further, avoids tunnel overhead between networks when devices do not need IP mobility.

Example embodiments can also offer an integrated (cost effective) Ethernet-based solution for the end-to-end (E2E) mobile architecture. In addition, example embodiments can provide a converged architecture for integrating the RAN, gateway, and control for a group of end users. In addition, the architecture can define and accommodate an architecture for both nomadic and mobile use cases. Programmable interfaces can be leveraged for programming L2, L3, L4-7 services for nomadic (fixed) and mobile users.

Figure 4:
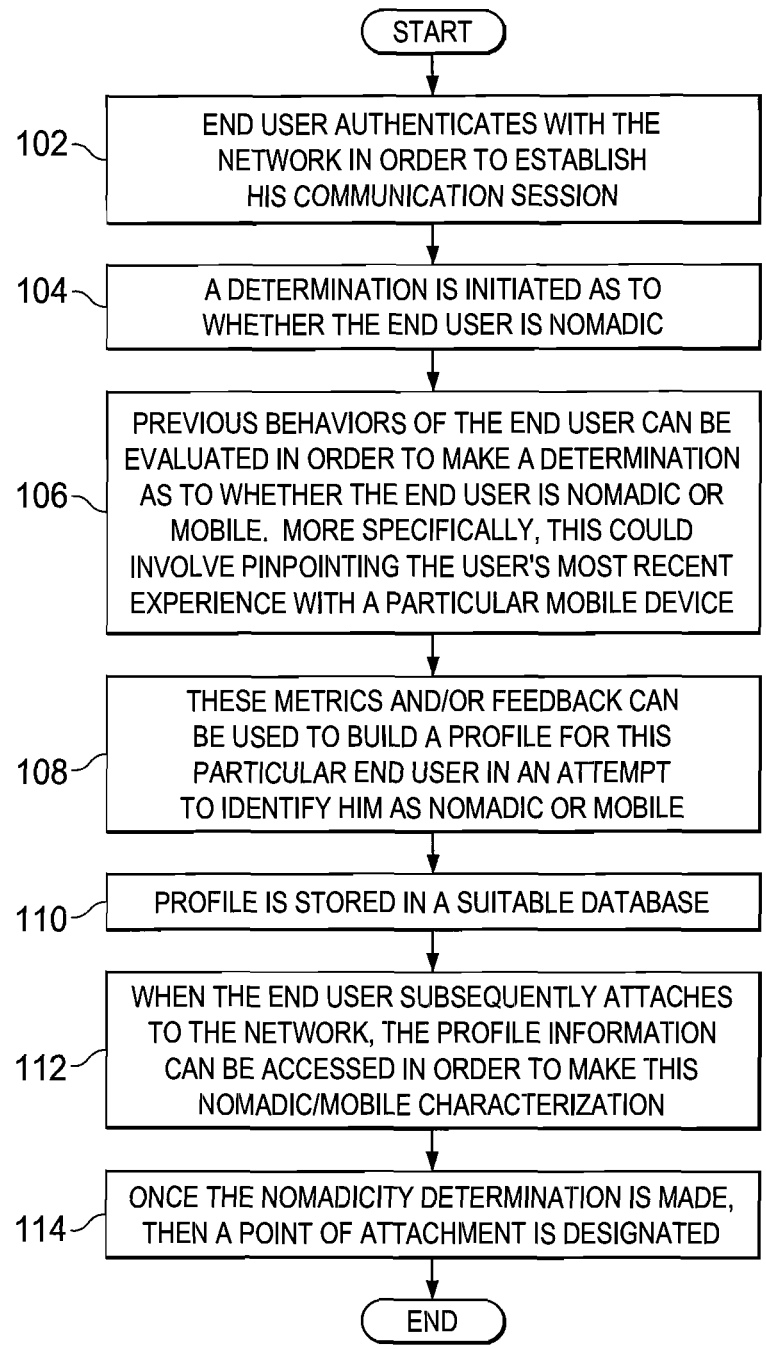
FIG. 4 is a simplified flowchart illustrating an example interaction involving certain aspects of gateway selectivity in accordance with one embodiment.

FIG. 4 is a simplified flowchart illustrating an example operational flow for a PDN gateway selection via a serving gateway without optimal routing capabilities. The IP address is the point of attachment and, therefore, should not change during the session. Thus, the focus of this flow is on session establishment. At step 102, the end user authenticates with the network in order to establish his communication session. This could involve interactions with a home location register (HLR), which could authenticate a SIM card associated with a mobile device. At step 104, a determination is initiated as to whether the end user is nomadic. This could involve evaluating a policy or profile associated with the end user (e.g., stored in a gateway, or in another suitable node), or it could involve identifying data associated with the SIM card. It could also involve determining how the end user is using the mobile device on this particular day.

At step 106, previous behaviors of the end user can be evaluated in order to make a determination as to whether the end user is nomadic or mobile. More specifically, this could involve pinpointing the user's most recent experience with [for example] a particular mobile device. Discerning which type of user this particular endpoint represents could involve recognizing the rate of cell changes, the rate of SGSN changes, bandwidth usage (where beyond a certain threshold, the user is most likely in a nomadic mode), etc. As a home network operator, a number of metrics can be made available in terms of tracking an end user's traffic patterns.

At step 108, these metrics and/or feedback can be used to build or to verify a profile for this particular end user in an attempt to identify him as nomadic or mobile. At step 110, the profile is stored in a suitable database (e.g., internal memory, a queue, a table, a repository, etc.) as part of a given gateway, or simply as its own separate component. When the end user subsequently attaches to the network, this information can be leveraged and accessed in order to make this nomadic/mobile characterization at step 112. Once the determination is made, then a point of attachment is designated, which is depicted in step 114. For the nomadic user, this person could be offloaded closer to his base station, where it may not be imperative to assure this end user is connected to a data center in the network.

Figure 5:
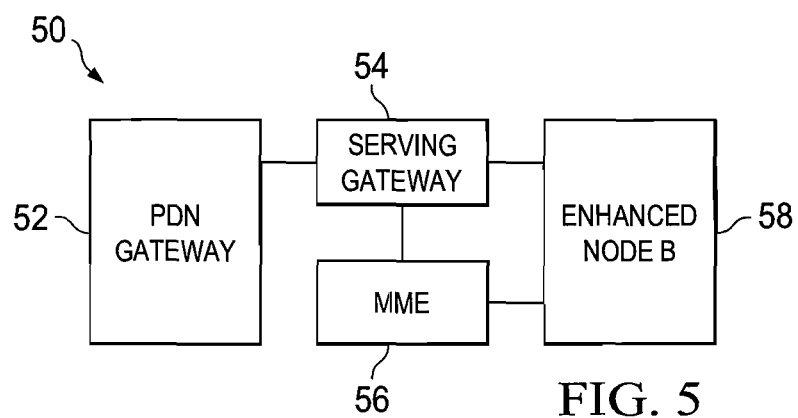
FIG. 5 is a simplified block diagram of an example implementation of a serving gateway selection architecture in accordance with one embodiment.

Turning to specific service gateway selection activities, FIG. 5 is a simplified block diagram of a system 50 that includes a serving gateway 54. This is a transient anchor in a 3GPP evolved packet core (EPC) through which packets propagate before they egress from a PDN gateway (PDN-GW) 52, which can be the IP point of attachment. Serving gateway 54 is augmented with an optimal routing capability, which allows packets transiting a common serving gateway to be optimally routed without having to be propagated through the PDN gateway. FIG. 5 also includes an MME element 56 and an enhanced node B (eNB) 58. Network operators can sporadically (e.g., hot-potato) route internet traffic from a subset of users, who may be using datacard devices, rather than transport packets back to a centralized PDN gateway. The architecture of FIG. 5 can offer a policy defined selection of a serving gateway to allow desirable handling of LTE traffic. Such a serving gateway allocation allows for an intelligent handling of PDN gateway traffic and, further, supports optimal offload from the cell site. Serving gateway element 54 provides external control of its optimal routing capability. External control can be via MME element 56, PCRF element (x), or a standalone decision function. The external control of optimal routing includes the ability to define which attached user equipment can receive optimal routing functions and which flows can be optimally routed.

Where a converged operator offers xDSL connectivity to a base station, there may be benefits to offload the traffic directly over the xDSL network and locate the PDN gateway in the broadband point of presence (POP). In some architectures, if the serving gateway is located in the mobile network, then optimal offload to the xDSL network cannot be achieved since such traffic needs to be transported across the mobile network to the serving gateway.

3GPP defines the ability to scale pools of MME and pools of serving gateway, with the serving gateway being selected by the MME. In other systems, the serving gateway selection function selects an available serving gateway to serve user equipment. The selection can be based on network topology (i.e., the selected serving gateway serves the end user's location) and, in case of overlapping serving gateway service areas, the selection may prefer serving gateways with service areas that reduce the probability of changing the serving gateway.

Example embodiments offer a selection of a serving-gateway, which can represent the opposite of the 3GPP rule that a serving gateway should be selected to reduce the probability of a serving gateway change (e.g., as the user moves). In particular, a policy interface is defined that takes input from various inputs including: 1) the typical data rates consumed by the user; 2) the serial number or IMEI that may relate to the form factor of the device; 3) the base station location including whether contiguous coverage is offered from a cell site; 4) the base station transmission capability including whether xDSL offload is available at the site; 5) the typical applications that are used by the user [e.g., HTTP, which offers a graceful restart capability compared to SIP services that do not], and other suitable inputs.

The policy element [which could be provided virtually anywhere in the network, or be part of any of the gateways, MME, or server discussed herein] can use the inputs together with a set of rules to determine which optimal serving gateway should serve the user, including possible selection of a serving gateway at the cell site, at the pre-aggregation site, or at an aggregation site. Additionally, a functionality can be defined to allow communication with the selected gateway. This may include an augmented MME functionality, an S11-proxy functionality for proxying the SAE gateway selection request to the correct SAE gateway, or a SAE gateway redirect capability, which interfaces with the policy and redirects the SAE gateway selection request to the policy derived SAE gateway selection.

Thus, example embodiments can offer an aggregation offload, while nomadic users can be offloaded directly to a PDN gateway at the nearest peering point. Mobile users can still be dealt at a hierarchical PDN gateway. In addition, a service gateway proxy is offered for roaming users, where a similar option can be provided for pico/femto scenarios. The serving gateway can be integrated into a cell site. Such features can be similar to the xDSL offload in the all-IP case.

Note that with the examples provided herein, interaction may be described in terms of two, three, four, or more network elements. However, this has been done for purposes of clarity and example only. In certain cases, it may be easier to describe one or more of the functionalities of a given set of flows by only referencing a limited number of network elements. It should be appreciated that communication system 10 (and its teachings) are readily scalable and can accommodate a large number of components, as well as more complicated or sophisticated arrangements and configurations. Accordingly, the examples provided should not limit the scope or inhibit the broad teachings of communication system 10 as potentially applied to a myriad of other architectures. Note also that the teachings discussed herein can readily be applied to wireless and femto access points and their respective environments.

It is also important to note that the steps described with reference to the preceding FIGURES illustrate only some of the possible scenarios that may be executed by, or within, communication system 10. Some of these steps may be deleted or removed where appropriate, or these steps may be modified or changed considerably without departing from the scope of the discussed concepts. In addition, a number of these operations have been described as being executed concurrently with, or in parallel to, one or more additional operations. However, the timing of these operations may be altered considerably. The preceding operational flows have been offered for purposes of example and discussion. Substantial flexibility is provided by communication system 10 in that any suitable arrangements, chronologies, configurations, and timing mechanisms may be provided without departing from the teachings of the discussed concepts.

Numerous other changes, substitutions, variations, alterations, and modifications may be ascertained to one skilled in the art and it can be intended that the discussed concept encompass all such changes, substitutions, variations, alterations, and modifications as falling within the scope of the appended claims. In order to assist the United States Patent and Trademark Office (USPTO) and, additionally, any readers of any patent issued on this application in interpreting the claims appended hereto, Applicant wishes to note that the Applicant: (a) does not intend any of the appended claims to invoke paragraph six (6) of 35 U.S.C. section 112 as it exists on the date of the filing hereof unless the words "means for" or "step for" are specifically used in the particular claims; and (b) does not intend, by any statement in the specification, to limit this invention in any way that is not otherwise reflected in the appended claims.

What is claimed is:

1. An apparatus, comprising:
a gateway configured to authenticate a first device of a user and to be coupled to a profiling function that makes a point of attachment determination for the first device, based, at least, on an average bandwidth consumption of the user, wherein
if an average bandwidth consumed by a second device of the user is determined to be greater than a predetermined threshold, the gateway defines an Internet Protocol (IP) service for the first device, and the point of attachment determination determines that the point of attachment for the first device is the gateway, and,
if the average bandwidth consumed by the second device of the user is determined to be less than the predetermined threshold, the gateway establishes a mobility tunnel to a point of attachment for the first device.

2. The apparatus of claim 1, wherein the point of attachment for the first device is a hierarchical gateway.

3. The apparatus of claim 2, wherein the mobility tunnel to the hierarchical gateway is a proxy mobile IP (PMIP) tunnel to a MIP Home Agent.

4. The apparatus of claim 1, wherein the profiling function queries a database that includes a profile for the second device.

5. The apparatus of claim 1, wherein a profile for the second device is identified in a RADIUS accounting request message sent by the gateway at an end of a session that involved the second device.

6. The apparatus of claim 5, wherein a profile for the first device is appended to a RADIUS Access Accept message that is sent when the first device is granted access to a network.

7. A method, comprising:
authenticating a first device of a user; and
executing, by a profiling function, a point of attachment determination for the first device, based, at least, on an average bandwidth consumption of the user, wherein
if an average bandwidth consumed by a second device of the user is determined to be greater than a predetermined threshold, a gateway defines an Internet Protocol (IP) service for the first device, and the point of attachment determination determines that the point of attachment for the first device is the gateway, and,
if the average bandwidth consumed by the second device of the user is determined to be less than the predetermined threshold, the gateway establishes a mobility tunnel to a point of attachment for the first device.

8. The method of claim 7, wherein the point of attachment for the first device is a hierarchical gateway.

9. The method of claim 8, wherein the mobility tunnel to the hierarchical gateway is a proxy mobile IP (PMIP) tunnel to a MIP Home Agent.

10. The method of claim 7, wherein the profiling function queries a database that includes a profile for the second device.

11. The method of claim 7, wherein a profile for the second device is identified in a RADIUS accounting request message sent by the gateway at an end of a session that involved the second device, and a profile for the first device is appended to a RADIUS Access Accept message that is sent when the first device is granted access to a network.

12. Logic encoded in one or more tangible, non-transitory media for execution and, when executed by a processor, operable to perform operations comprising:
authenticating a first device of a user; and
executing, with a profiling function, a point of attachment determination for the first device, based, at least, on an average bandwidth consumption of the user, wherein
if an average bandwidth consumed by a second device of the user is determined to be greater than a predetermined threshold, a gateway defines an Internet Protocol (IP) service for the first device, and the point of attachment determination determines that the point of attachment for the first device is the gateway, and,
if the average bandwidth consumed by the second device is determined to be less than the predetermined threshold, the gateway establishes a mobility tunnel to a point of attachment for the first device.

13. The logic of claim 12, wherein the point of attachment for the first device is a hierarchical gateway.

14. The logic of claim 13, wherein the mobility tunnel to the hierarchical gateway is a proxy mobile IP (PMIP) tunnel to a MIP Home Agent.

15. The logic of claim 12, wherein the profiling function queries a database that includes a profile for the second device, the profile for the second device being identified in a RADIUS accounting request message sent by the gateway at an end of a session that involved the second device, and a profile for the first device is appended to a RADIUS Access Accept message that is sent when the first device is granted access to a network.

16. A system, comprising:
means for authenticating a first device of a user; and
means for executing, with a profiling function, a point of attachment determination for the first device, based, at least, on an average bandwidth consumption of the user, wherein
if an average bandwidth consumed by a second device of the user is determined to be greater than a predetermined threshold, a gateway defines an Internet Protocol (IP) service for the first device, and the point of attachment determination determines that the point of attachment for the first device is the gateway, and,
if the average bandwidth consumed by the second device is determined to be less than the predetermined threshold, the gateway establishes a mobility tunnel to a point of attachment for the first device.

17. The system of claim 16, wherein the point of attachment for the first device is a hierarchical gateway.

18. The system of claim 17, wherein the mobility tunnel to the hierarchical gateway is a proxy mobile IP (PMIP) tunnel to a MIP Home Agent.

19. The system of claim 16, wherein the point of attachment determination is based on a rate of cell changes from one or more previous sessions for the second device, and a previous geographic location for the second device.

20. The system of claim 16, wherein the profiling function queries a database that includes a profile for the second device.

21. The system of claim 16, wherein a profile for the second device is identified in a RADIUS accounting request message sent by the gateway at an end of a session that involved the second device, and a profile for the first device is appended to a RADIUS Access Accept message that is sent when the first device is granted access to a network.

\* \* \* \* \*